(12) United States Patent
Cieslak et al.

(10) Patent No.: US 11,539,814 B1
(45) Date of Patent: Dec. 27, 2022

(54) FRIEND CAPABILITY CACHING

(71) Applicants: Michael Cieslak, Los Angeles, CA (US); Jiayao Yu, Venice, CA (US); Kai Chen, Manhattan Beach, CA (US); Farnaz Azmoodeh, Venice, CA (US); Michael David Marr, Monroe, WA (US); Jun Huang, Beverly Hills, CA (US); Zahra Ferdowsi, Marina del Rey, CA (US)

(72) Inventors: Michael Cieslak, Los Angeles, CA (US); Jiayao Yu, Venice, CA (US); Kai Chen, Manhattan Beach, CA (US); Farnaz Azmoodeh, Venice, CA (US); Michael David Marr, Monroe, WA (US); Jun Huang, Beverly Hills, CA (US); Zahra Ferdowsi, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 77 days.

(21) Appl. No.: 16/425,423

(22) Filed: May 29, 2019

(51) Int. Cl.
*G06F 15/167* (2006.01)
*H04L 67/568* (2022.01)
*H04L 67/306* (2022.01)
*H04L 67/01* (2022.01)
*H04L 9/40* (2022.01)

(52) U.S. Cl.
CPC .......... *H04L 67/568* (2022.05); *H04L 67/01* (2022.05); *H04L 67/306* (2013.01); *H04L 63/08* (2013.01)

(58) Field of Classification Search
CPC ... H04L 67/2842; H04L 67/306; H04L 67/42; H04L 63/08; H04L 67/535; H04L 63/0428; H04L 67/30; H04L 67/568; H04L 43/06; H04L 63/065; H04L 67/55
See application file for complete search history.

(56) References Cited

U.S. PATENT DOCUMENTS

| | | | | |
|---|---|---|---|---|
| 7,636,764 B1* | 12/2009 | Fein | ......................... | H04L 67/63 |
| | | | | 709/212 |
| 2004/0139233 A1* | 7/2004 | Kellerman | ......... | H04N 21/2408 |
| | | | | 348/E7.078 |
| 2004/0203746 A1* | 10/2004 | Knauerhase | .......... | H04W 4/029 |
| | | | | 455/432.1 |
| 2005/0166157 A1* | 7/2005 | Ollis | ..................... | G06F 3/0482 |
| | | | | 715/764 |
| 2006/0223503 A1* | 10/2006 | Muhonen | .......... | H04M 1/72406 |
| | | | | 455/418 |
| 2008/0082421 A1* | 4/2008 | Onyon | ............... | G06Q 30/0207 |
| | | | | 705/14.1 |
| 2009/0164639 A1* | 6/2009 | Sylvain | ................... | H04L 67/01 |
| | | | | 709/227 |
| 2009/0177794 A1* | 7/2009 | Alexander | ............ | G06F 16/435 |
| | | | | 709/237 |

(Continued)

*Primary Examiner* — Dustin Nguyen
*Assistant Examiner* — Hao H Nguyen
(74) *Attorney, Agent, or Firm* — Culhane Meadows PLLC; Stephen J. Weed

(57) ABSTRACT

Friend capability caching designed to allow a user of an application to improve a user's experience based on the shared capabilities of a set of friends. Communication between client devices can be improved by knowing the shared capabilities, such as a device type, media format and media size. The client devices store capabilities of friends devices such that a client device can communicate with other client devices as a function of the friend device capabilities.

14 Claims, 8 Drawing Sheets

(56) References Cited

U.S. PATENT DOCUMENTS

| | | | | |
|---|---|---|---|---|
| 2011/0225417 | A1* | 9/2011 | Maharajh | G06Q 10/06 |
| | | | | 713/150 |
| 2011/0269424 | A1* | 11/2011 | Multer | H04L 67/1095 |
| | | | | 455/411 |
| 2013/0138738 | A1* | 5/2013 | Li | H04L 65/403 |
| | | | | 709/204 |
| 2013/0318347 | A1* | 11/2013 | Moffat | H04L 63/08 |
| | | | | 713/168 |
| 2014/0057667 | A1* | 2/2014 | Blankenship | H04W 4/023 |
| | | | | 455/500 |
| 2014/0095578 | A1* | 4/2014 | Rajendran | G06F 9/5044 |
| | | | | 719/313 |
| 2014/0115090 | A1* | 4/2014 | Hasek | H04N 21/21815 |
| | | | | 709/213 |
| 2014/0213280 | A1* | 7/2014 | Sandel | H04W 4/029 |
| | | | | 455/456.1 |
| 2015/0271318 | A1* | 9/2015 | Antos | H04L 41/0853 |
| | | | | 455/412.1 |
| 2015/0339368 | A1* | 11/2015 | Gruber | G06F 16/273 |
| | | | | 707/613 |
| 2016/0005255 | A1* | 1/2016 | Nelson | G07F 17/3274 |
| | | | | 463/42 |
| 2016/0308995 | A1* | 10/2016 | Youdale | H04W 48/02 |
| 2017/0041433 | A1* | 2/2017 | Shuman | H04L 65/4076 |
| 2019/0171693 | A1* | 6/2019 | Dotan-Cohen | H04L 67/306 |
| 2019/0182114 | A1* | 6/2019 | Tavridis | H04L 41/16 |
| 2020/0019644 | A1* | 1/2020 | Mazouchi | G06N 20/00 |

\* cited by examiner

| Device 1 | Media Format A | Media Size E |
|---|---|---|
| Device 2 | Media Format B | Media Size F |
| Device 3 | Media Format C | Media Size G |
| ... | | |
| Device N | Media Format D | Media Size H |

FIG. 6

| Friend | Device | Media Format | Media Size |
|---|---|---|---|
| Friend 1 | A | E | I |
| Friend 2 | B | F | J |
| Friend 3 | C | G | K |
| ... | ... | ... | ... |
| Friend N | D | H | L |

FRIEND CAPABILITY CACHING

TECHNICAL FIELD

The present disclosure generally relates to performance and capabilities of various client devices.

BACKGROUND

Performance and capabilities of hardware of client devices vary from device to device. The performance and capabilities of hardware affect communication between client devices.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which:

FIG. 6 illustrates an example chart of device capabilities;

FIG. 7 illustrates an example chart of friend device capabilities;

DETAILED DESCRIPTION

Figure 1:
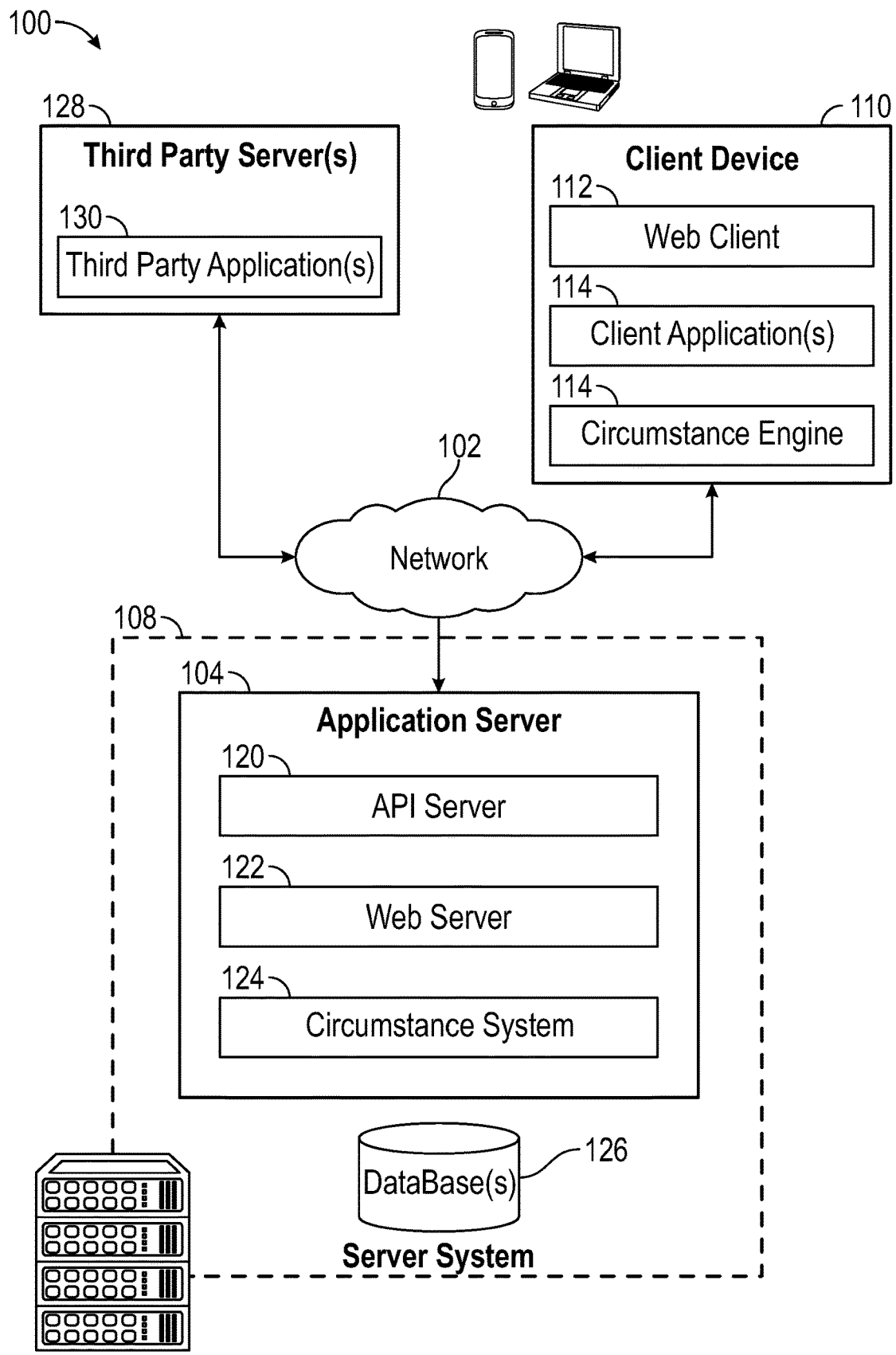
FIG. 1 is a block diagram illustrating a system configured to establish friend device capabilities for friends stored on client device.

The description that follows includes systems, methods, techniques, instruction sequences, and computing machine program products illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

One aspect of the present disclosure describes friend device capability caching designed to allow an application to improve a user's experience based on the shared capabilities of a set of friends' devices. In one example, when two users are communicating with each other using an application and based on the devices they are using, aspects of this disclosure improve the media format and media size (e.g. image size, video bitrate) to improve communication between the devices. In a more complex example, a group of friends can all be communicating with each other, like in a group chat, and this disclosure improves the media format and media size to improve the communication experience. This is non-trivial because each user can be using a different device with different performance or hardware capabilities. Moreover, a user can switch devices at any time, so tracking the capabilities of the device they are currently using must be done dynamically.

When a user logs into a server system, the server system associates the user's device with a given set of capabilities based on their device. These capabilities may be determined through a variety of methods, including but not limited to querying the device hardware for hardware functions (e.g., cryptography processing support, image or video encode/decode), directly measuring the timing or performance of certain program paths within the application, or inferring the likely performance from externally published performance benchmarks for that device model. A device information databank contains these capabilities for each device. Examples of friend capabilities include average connection speed, screen size, operating system (OS) version, and encryption hardware. During this assignment stage, four things are done. First, a calculation is made to calculate how likely the user is to change devices which tells if caching model specific capabilities is feasible. Second, a calculation is made on the mutual set of capabilities for all devices the user uses. Third, these two sets are combined to form the cacheable properties for this user and are stored for later lookup. Lastly, if it is detected any core capability has changed, a message can be generated and sent to everyone who is currently caching that user's data to delete the user's data or otherwise request an update.

Details of the friend caching is provided below.

FIG. 1 is a block diagram illustrating a system 100, according to some examples, configured to establish friend device capabilities for friends stored on client device 110. The system 100 includes one or more client devices such as client device 110. The client device 110 includes, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the system 100. In some examples, the client device 110 includes a display module (not shown) to display information (e.g., in the form of user interfaces). In further examples, the client device 110 includes one or more of touch screens, accelerometers, gyroscopes, cameras, microphones, global positioning system (GPS) devices, and so forth. The client device 110 may be a device of a user that is used to access and utilize an online social platform.

For example, client device 110 is a device of a given user who uses an application 114 on an online social platform, a gaming platform, and communication applications. Client device 110 accesses a website, such as an online social platform hosted by a server system 108. The user inputs login credentials associated with the user. Server system 108 receives the request and provides access to the online social platform.

A user of the client device 110 launches and engages an application 114 hosted by the server system 108. The client device 110 has a circumstance engine 116 including a processor running client code for performing the acquisition and caching of the capabilities of several friend devices on the client device 110. The circumstance engine 116 obtains the friend device capabilities from the server system 108 and stores the friend device capabilities in a friend capabilities cache without significantly affecting operation of the application 114. The server system 108 automatically and dynamically uploads and updates the friend device capabilities when the client device 110 logs into a different device on to the server system 108, such as when a friend logs into a different device. In certain implementations, this update may only be performed when the friend connects from a substantially different device such that the previously known hardware capabilities for that friend's device no longer accurately reflect their hardware device, and therefore require updating.

One or more users may be a person, a machine, or other means of interacting with the client device 110. In examples, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., third-party servers 130, server system 108, etc.) via the network 102. In this instance, the other entities in the system 100, in response to receiving the input from the user, may communicate information to the client device 110 via the network 102 to be presented to the user. In this way, the user interacts with the various entities in the system 100 using the client device 110.

The system 100 further includes a network 102. One or more portions of network 102 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a 4G LTE network, another type of network, or a combination of two or more such networks.

The client device 110 may access the various data and applications provided by other entities in the system 100 via web client 112 (e.g., a browser) or one or more client applications 114. The client device 110 may include one or more client application(s) 114 (also referred to as "apps") such as, but not limited to, a web browser, messaging application, multi-player gaming application, electronic mail (email) application, an e-commerce site application, a mapping or location application, an online home buying and selling application, a real estate application, and the like.

In some examples, one or more client application(s) 114 are included in a given one of the client device 110, and configured to locally provide the user interface and at least some of the functionalities, with the client application(s) 114 configured to communicate with other entities in the system 100 (e.g., third-party server(s) 128, server system 108, etc.), on an as-needed basis, for data processing capabilities not locally available (e.g., to access location information, to authenticate a user, etc.). Conversely, one or more client application(s) 114 may not be included in the client device 110, and then the client device 110 may use its web browser to access the one or more applications hosted on other entities in the system 100 (e.g., third-party server(s) 128, server system 108, etc.).

A server system 108 provides server-side functionality via the network 102 (e.g., the Internet or wide area network (WAN)) to: one or more third party server(s) 128, and one or more client devices 110. The server system 108 includes an application server 104 including an application program interface (API) server 120, a web server 122, and a clustering system 124, that may be communicatively coupled with one or more database(s) 126. The one or more database(s) 126 may be storage devices that store data related to users of the server system 108, applications associated with the server system 108, cloud services, housing market data, and so forth. The one or more database(s) 126 may further store information related to third-party server(s) 128, third-party application(s) 130, client device 110, client application(s) 114, users, and so forth. In one example, the one or more database(s) 126 may be cloud-based storage.

The server system 108 may be a cloud computing environment, according to some examples. The server system 108, and any servers associated with the server system 108, may be associated with a cloud-based application, in one example.

The server system 108 includes a circumstance system 124. Circumstance system 124 may include one or more servers and may be associated with a cloud-based application. Circumstance system 124 has a circumstance engine service 202 (FIG. 2) that obtains device capabilities of friends communicating with the operating application 114 on the client device 110 by merging data from a friend's capability service 204, which contains information of the device a friend is using, and merging that with data from a device information databank which contains what each device is capable of. The details of the circumstance system 124 are provided below in connection with FIG. 2, and the details of the circumstance engine 116 are provided below in connection with FIG. 3.

The system 100 further includes one or more third party server(s) 128. The one or more third-party server(s) 128 may include one or more third party application(s) 130. The one or more third party application(s) 130, executing on third party server(s) 128 may interact with the server system 108 via API server 120 via a programmatic interface provided by the API server 120. For example, one or more of the third-party applications 132 may request and utilize information from the server system 108 via the API server 120 to support one or more features or functions on a website hosted by the third party or an application hosted by the third party. The third-party application(s) 130, for example, may provide software version analysis functionality that is supported by relevant functionality and data in the server system 108.

Figure 2:
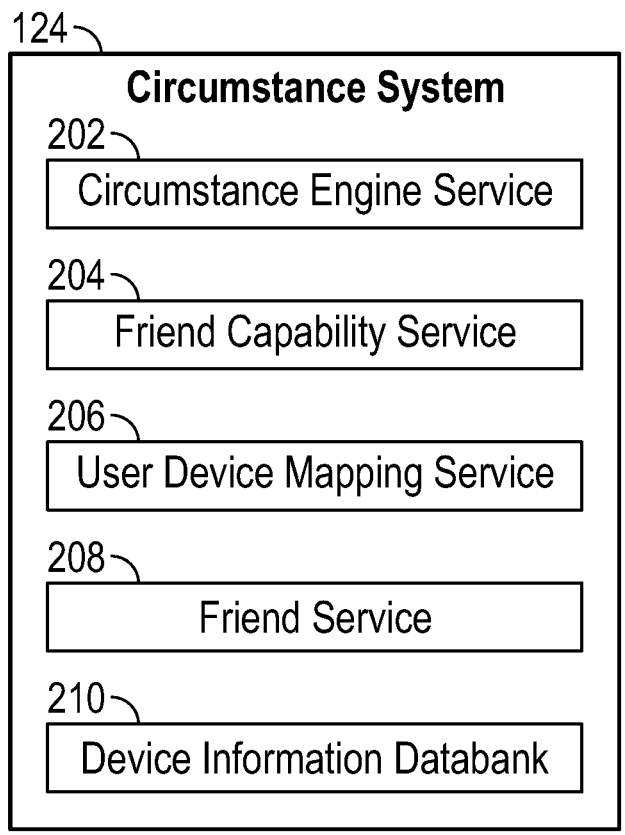
FIG. 2 is a block diagram illustrating the circumstance system operable within server system.
Figure 4:
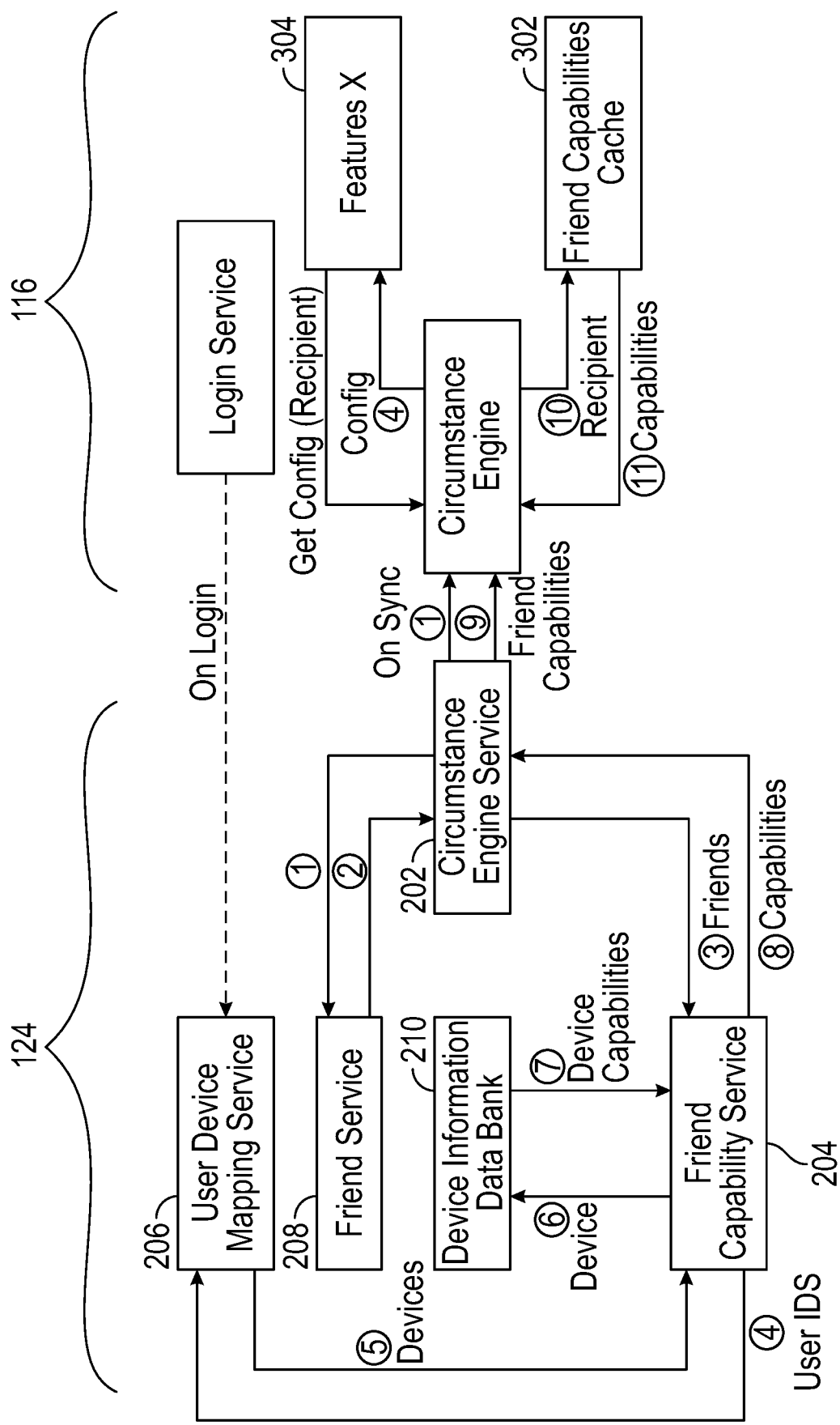
FIG. 4 illustrates a functional block diagram of the circumstance system being operable to ascertain and store the friend device capabilities for a plurality of client devices.

FIG. 2 is a block diagram illustrating the circumstance system 124 operable within server system 108. Circumstance system 124 is seen to include a circumstance engine service 202, a friend capability service 204, a user device mapping service 206, a friend service 208, and data structures including a device information databank 210. The circumstance engine service 202 provides the application 114 running on the client device 110 with configuration settings based on user, device, and current circumstances. When the application 114 fetches this data, the circumstance engine service 202 returns the capabilities of the users/contacts that the user of client device 110 communicates most frequently with. In one example, the circumstance engine services 202 returns the data for the top N friends. In another example, the circumstance engine services 202 returns the data for all friends or contacts whose hardware status has changed since the last update that the client device 110 previously received. This data is then persisted on the client device 110 in a database stored in friend capabilities cache 302 and keyed on the friend's user identification (ID). An example of friend capabilities is shown in FIG. 4. Examples of friend capabilities include codecs supported, network/app performance, average connection speed, screen size, OS version, encryption hardware, etc. The friend capabilities cache 302 is stored in memory 904 (FIG. 9) and will also be persisted to disk. The friend capabilities cache 302 includes detailed information on hardware and performance of each friend's device. This friend capabilities cache 302 may include information for every contact, not just the top ones.

For example, friend capabilities can include device type of a set of friends, such as the N friends the user most frequently communicates with, for example, the top 20 friends.

Figure 3:
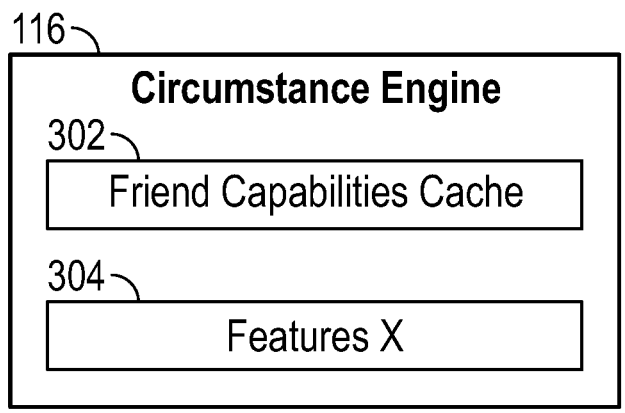
FIG. 3 is a block diagram illustrating the circumstance engine operable on the client device.

FIG. 3 is a block diagram illustrating the circumstance engine 116 operable on the client device 110. The circumstance engine 116 is seen to include a friend capabilities cache 302 and features X 304, which implicitly map the capabilities that are needed for the feature to function when used between two friend's devices. Features X 304 implicitly map to capabilities that are needed for the feature to function when used between two friends. The circumstance engine 116 of the client device 110 uses a client device processor/CPU 902 (FIG. 8) executing code configured to request friend capabilities from circumstance engine service 202 of the server system 108 upon logIn of client device 110 with server system 108.

FIG. 4 illustrates a functional block diagram of the circumstance system 124 being operable to ascertain and store the friend device capabilities for a plurality of client devices 110, and sharing the friend device capabilities with the circumstance engine 116 of a client device 110. Examples of friend capabilities include average connection speed, screen size, operating system (OS) version, and encryption hardware.

Figure 5:
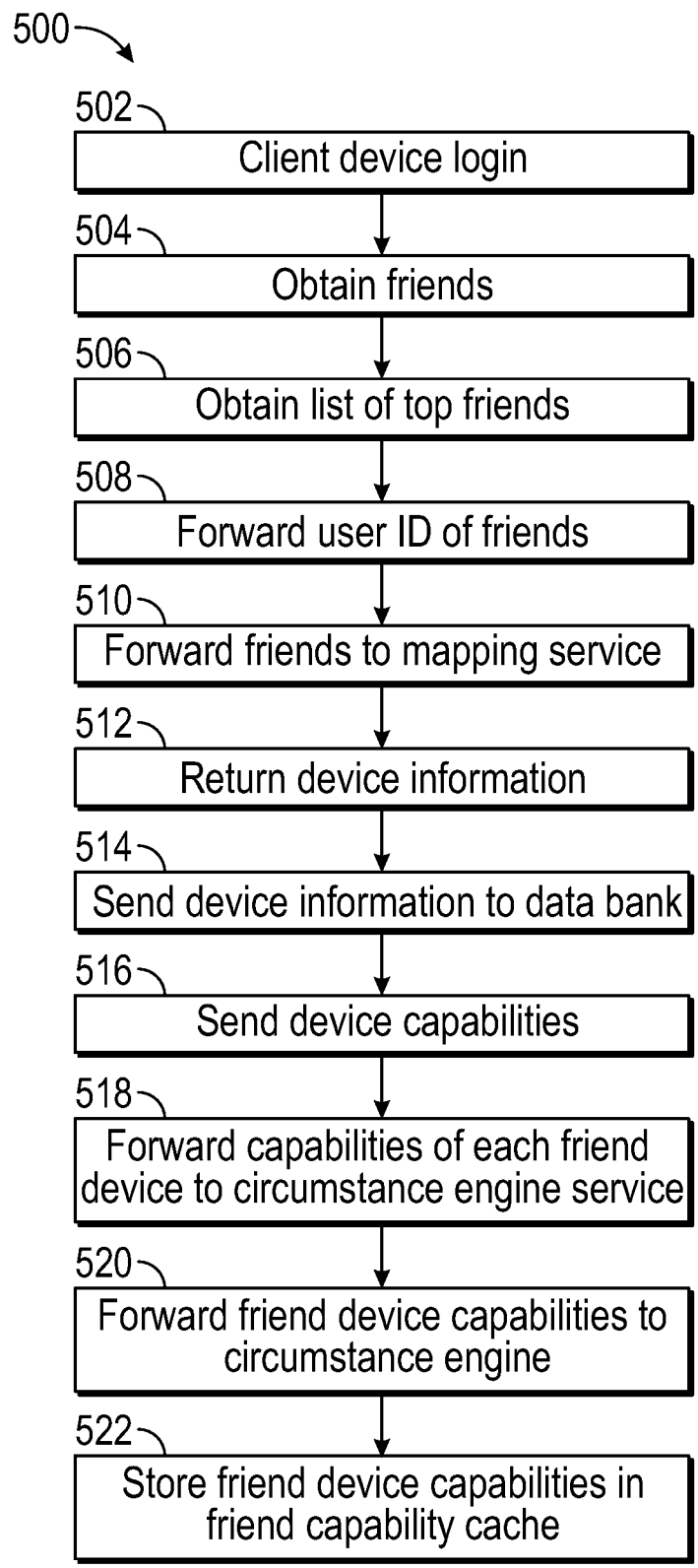
FIG. 5 illustrates an example algorithm of the circumstance system and the circumstance engine.
Figure 9:
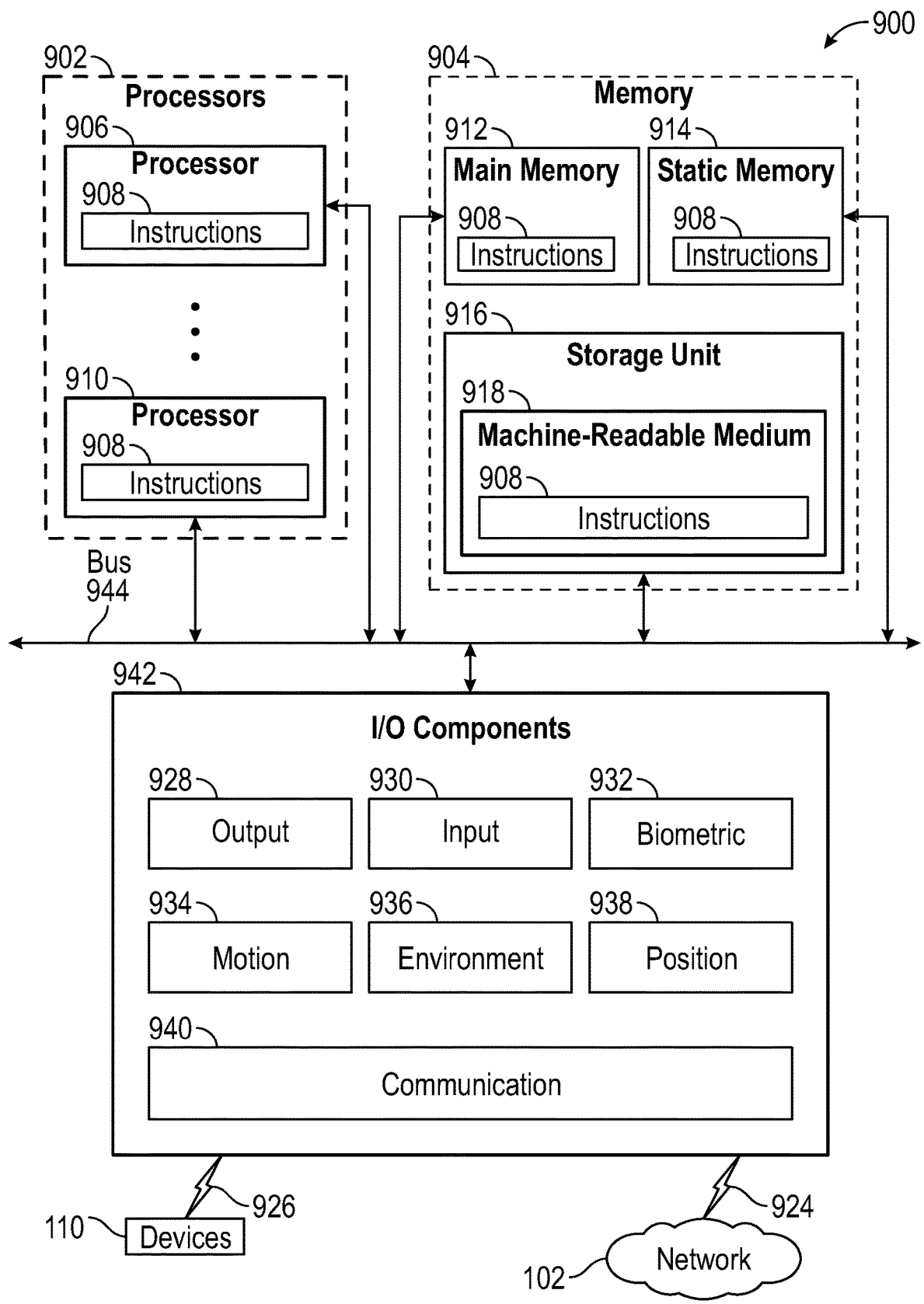
FIG. 9 is a diagrammatic representation of a machine in the form of a computer system within which a set of instructions may be executed for causing the machine to perform any one or more of the methodologies discussed herein, in accordance with some examples.

FIG. 5 illustrates an example algorithm 500 of the circumstance system 124 and the circumstance engine 116 executed by instructions 908 running in the processor 902 of server system 108 (FIG. 9).

Referring to FIG. 4 and FIG. 5, at block 502, the user of client device 110 logs on to the server system 108 using a login program (designated "onLogin" in the figures). When the user logs into the server system 108, the server system 108 associates the user's client device 110 with a given set of capabilities based on their device. The device information databank 210 contains the capabilities for each client device 110. During this assignment stage, four things are done. First, the circumstance system 124 calculates how likely the user of client device 110 is to change devices, which tells if caching model specific capabilities is feasible for this user. Second, the circumstance system 124 calculates the mutual set of capabilities for all client devices 110 the user uses. Third, these two sets are combined to form the cacheable properties for this user and which are stored for later lookup. Lastly, if the circumstance system 124 detects that any core capability of the user device 110 has changed, a message can be generated and sent to client devices of friends that are currently caching that client device data. There are variety of ways to communicate changes. The one described here is a "push" message—like a typical pub-sub model where the participating user "publishes" their changes to a set of "subscribers" who are their friends. Another method is where each user device checks requests info about any changes to friend's devices since last being updated. This latter thing is the "delta updates" model.

Referring to FIG. 5, at block 504, the circumstance engine service 202 queries (numeral "1" in FIG. 4) the friend service 208 to obtain (numeral "2" in FIG. 4) all the friends of client device 110. The friend service 208 stores a list of all friends stored in the client device 110 in a relational database, so this data is readily available and accessible. This list of friends is dynamically updated over time as this information changes on the client device 110.

At block 506, the friend service 208 returns (numeral "2" in FIG. 4) a list of the top friends of the user of client device 110. A rule can be set by friend service 208, such as listing a number of friends based on both an engagement level (i.e. degree of interaction) with them as well as based on the capabilities of a user's phone. In other words, a certain amount of data is cached in friend capability cache 302 based on the capabilities of client device 110, and this will scale with the capabilities of that device. The friend capability cache 302 may contain "only" ~100 friends, or it may cache all contacts (several hundred for a well-connected user). Basically, the bigger/better phone, the closer the tracking of more of the user's two-way contacts.

At block 508, the circumstance engine service 202 forwards (numeral "3" in FIG. 4) the list of friends to the friend capability service 204. This list of friends includes the userID of each friend.

At block 510, the friend capability service 204 forwards (numeral "4" in FIG. 4) the userID of each of the friends in the list to the user device mapping service 206. The userID of each friend is maintained in the friend capability service 204 and is dynamically updated. The user friend capability service 204 includes a relational database of all the userIDs associated with friends that are registered to communicate with the application server 104.

At block 512, the user device mapping service 206 returns (numeral "5" in FIG. 4) device information indicative of the device associated with each of the userIDs to the friend capability service 204. The user device mapping service 206 includes a relational database of all the devices associated with userIDs that are registered to communicate with the application server 104.

At block 514, the friend capability service 204 sends (numeral "6" in FIG. 4) the received device information to the device information data bank 210. The device data bank 210 stores a plurality of capabilities for all devices operable on the application server 104, such as the device processor, processor speed, media format and media size. An example chart of device capabilities is shown in FIG. 6. An example of friend capabilities is shown in FIG. 4. Examples of friend capabilities include average connection speed, screen size, operating system (OS) version, and encryption hardware.

At block 516, the device information data bank 210 reports (numeral "7" in FIG. 4) the device capabilities for each of the friend devices to the friend capability service 204. The device information capabilities include the media format and the media size for each of the friend devices. An example chart of friend device capabilities is illustrated in FIG. 7. Only the device capabilities are sent to prevent users from knowing devices each other are using.

At block 518, the friend capability service 204 forwards (numeral "8" in FIG. 4) the reported capabilities for each of the friend devices to the circumstance engine service 202. The circumstance engine 202 manages the communications with circumstance engine service 202, and also the friend capabilities cache 302.

At block 520, the circumstance engine service 202 forwards (numeral "9" in FIG. 4) the friend capabilities of each of the client device 110 friends to the circumstance engine 116. Circumstance engine 116 now has the device capabilities of each of the user's friends.

At block 522, the circumstance engine 116 stores (numeral "10" in FIG. 4) all of the friend device capabilities of each friend device in the friend capabilities cache 302. For example, the friend device capabilities include media format and media size, the supported codecs and the performance of the user's network determine media format and size. The capabilities are the more primitive pieces of data—i.e. codecs supported, network/app performance, average connection speed, screen size, OS version, encryption hardware, etc.

When the client device 110 communicates with client devices 110 of friends, the client device 110 (numeral "11" in FIG. 4) communicates with different friend devices in different media formats and media size as a function of the respective capabilities of the devices. Format and size are resolved dynamically by looking at more primitive units of information and selected with the circumstance rules system.

The friend capabilities algorithm 500 is used to help reduce the amount of data that is shared between client devices 110 and the server system 108 to reduce bandwidth. The cached friend capabilities help determine the best shared format for exchanging data.

Figure 8:
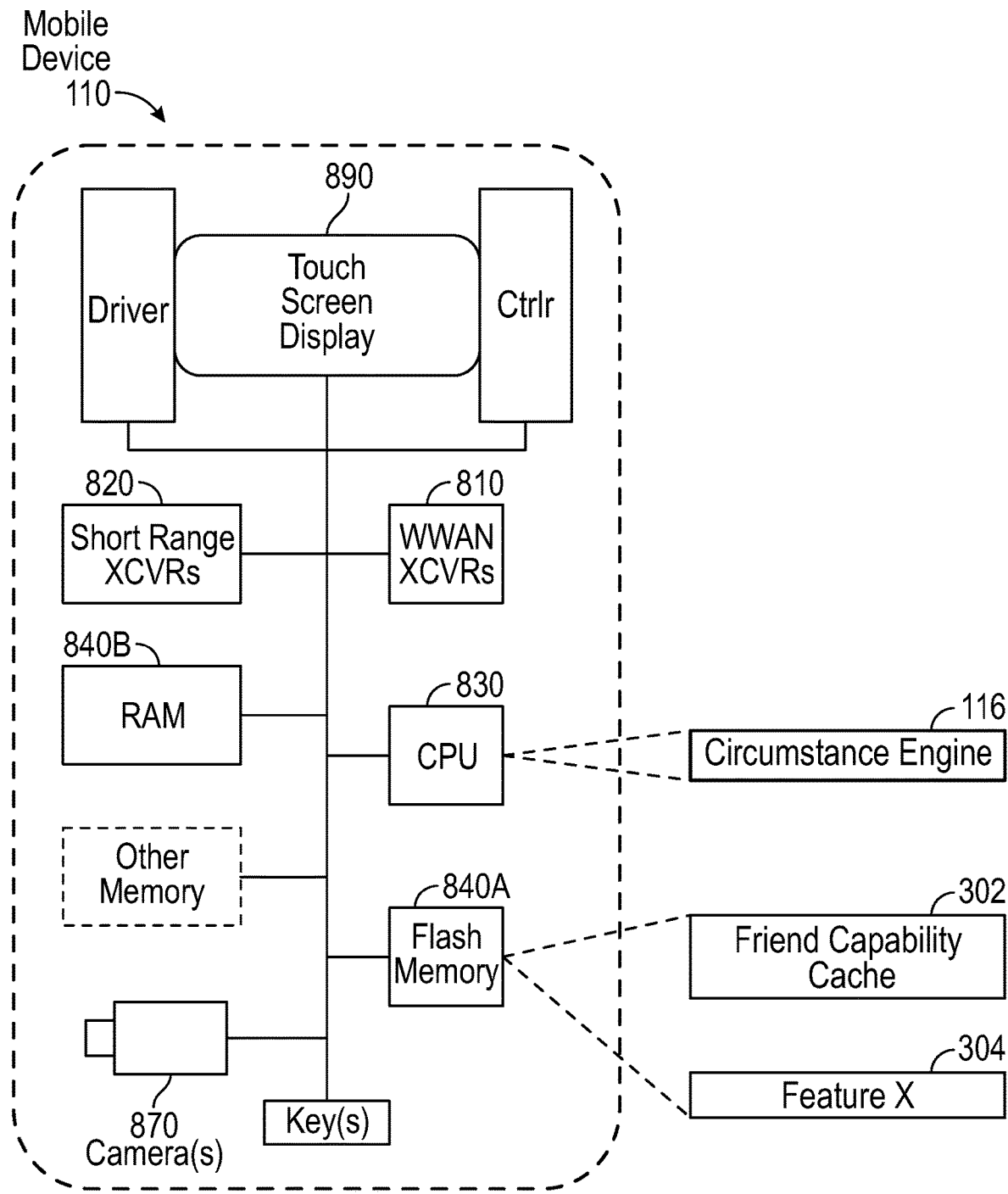
FIG. 8 is a high-level functional block diagram of an example client device comprising a mobile device that communicates via network with server system.

FIG. 8 is a high-level functional block diagram of an example client device 110 comprising a mobile device that communicates via network 102 with server system 108 of FIG. 9. Shown are elements of a touch screen type mobile device 890 having the circumstance engine 116, although other non-touch type mobile devices can be used under consideration here. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example, and the subject technology as described herein is not intended to be limited thereto. For purposes of this discussion, FIG. 8 therefore provides a block diagram illustration of the example mobile device 110 having a touch screen display for displaying content and receiving user input as (or as part of) the user interface. Mobile device 890 also includes a camera(s) 870, such as visible light camera(s).

The activities that are the focus of discussions here involve determining and caching friend device capabilities on the mobile device 110. As shown in FIG. 8, the mobile device 110 includes at least one digital transceiver (XCVR) 810, shown as WWAN XCVRs, for digital wireless communications via a wide area wireless mobile communication network 102. The mobile device 110 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11 and 4G LTE.

To generate location coordinates for positioning of the mobile device 890, the mobile device 890 can include a global positioning system (GPS) receiver. Alternatively, or additionally the mobile device 110 can utilize either or both the short range XCVRs 820 and WWAN XCVRs 810 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 820.

The transceivers 810, 820 (network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 810, 820 provide two-way wireless communication of information including digitized audio signals, still image and video signals, web page information for display as well as web related inputs, and various types of mobile message communications to/from the mobile device 110 for user identification strategies.

Several of these types of communications through the transceivers 810, 820 and a network, as discussed previously, relate to protocols and procedures in support of communications with the server system 108 for obtaining and storing friend device capabilities. Such communications, for example, may transport packet data via the short range XCVRs 820 over the wireless connections of network 102 to and from the server system 108 as shown in FIG. 1. Such communications, for example, may also transport data utilizing IP packet data transport via the WWAN XCVRs 810 over the network (e.g., Internet) 102 shown in FIG. 1. Both WWAN XCVRs 810 and short range XCVRs 820 connect through radio frequency (RF) send-and-receive amplifiers (not shown) to an associated antenna (not shown).

The mobile device 110 further includes a microprocessor 830, shown as a CPU, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 830, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 830 or processor hardware in smartphone, laptop computer, and tablet.

The microprocessor 830 serves as a programmable host controller for the mobile device 110 by configuring the mobile device to perform various operations, for example, in accordance with instructions or programming executable by processor 830. For example, such operations may include various general operations of the mobile device, as well as operations related to performance metric monitoring, reporting to server system 108, and gating. Although a processor may be configured by use of hardwired logic, typical processors in mobile devices are general processing circuits configured by execution of programming.

The mobile device 110 includes a memory or storage device system, for storing data and programming. In the example, the memory system may include a flash memory 840A and a random access memory (RAM) 840B. The RAM 840B serves as short term storage for instructions and data being handled by the processor 830, e.g. as a working data processing memory. The flash memory 840A typically provides longer term storage.

Hence, in the example of mobile device 110, the flash memory 840A is used to store programming or instructions for execution by the processor 830. Depending on the type of device, the mobile device 110 stores and runs a mobile operating system through which specific applications, including application 114. Applications, such as the friend device capabilities, may be a native application, a hybrid application, or a web application (e.g., a dynamic web page executed by a web browser) that runs on mobile device 890 to uniquely identify the user. Examples of mobile operating systems include Google Android®, Apple iOS® (I-Phone or iPad devices), Windows Mobile®, Amazon Fire OS®, RIM BlackBerry® operating system, or the like.

As shown, flash memory 840A storage device stores a database of device capabilities as shown in FIG. 6 and FIG. 7.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to network 102 and client devices 110 via a coupling 924 and a coupling 926, respectively. For example, the communication components 940 may include a network interface component or another suitable device to interface with the network 102. In further examples, the communication components 940 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 102, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Figure 10:
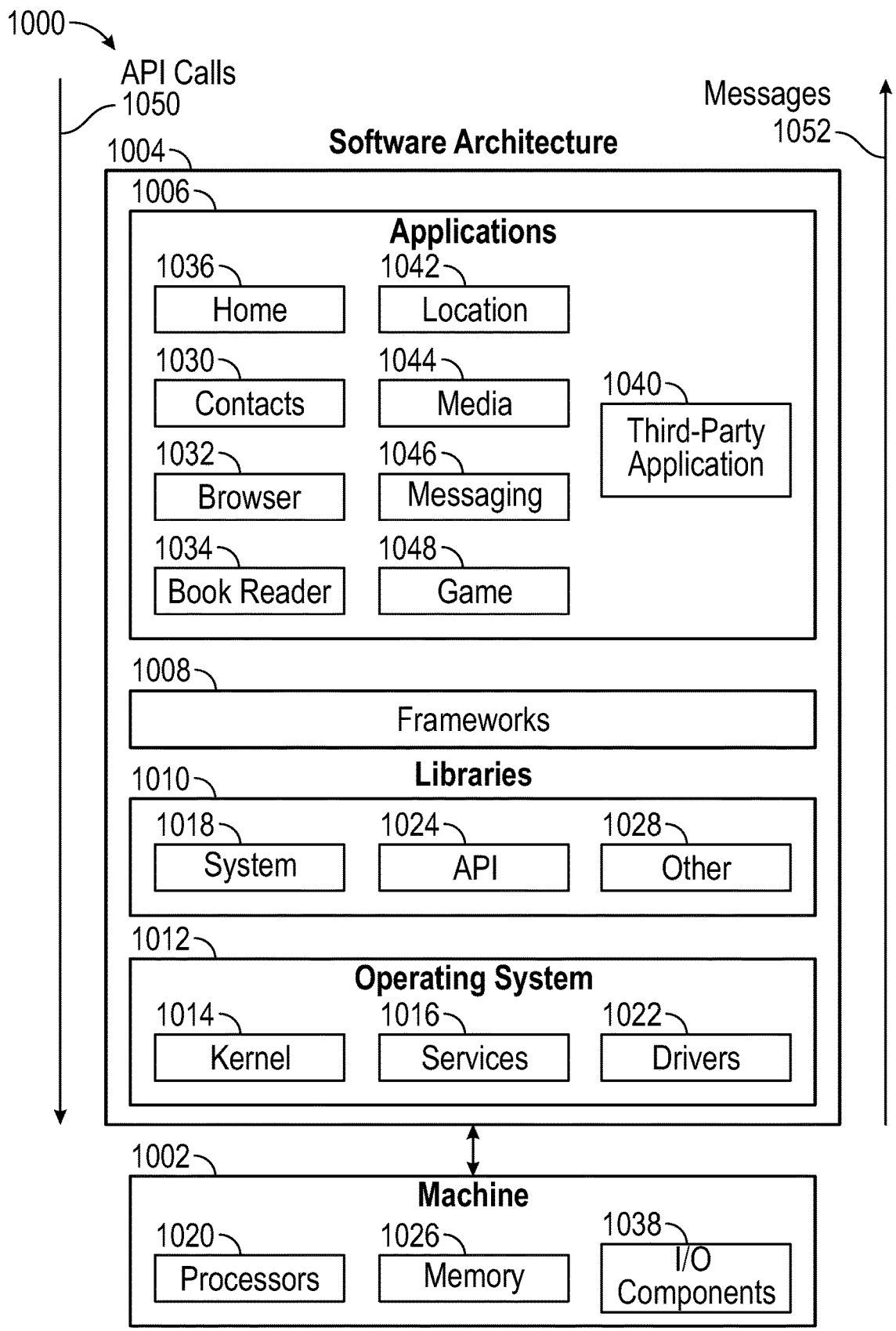
FIG. 10 is block diagram showing a software architecture within which the present disclosure may be implemented, in accordance with examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The e applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

The terms and expressions used herein are understood to have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. A method comprising:
 receiving, by a server processor, friend data of a group of friends from a respective client device running an application of a plurality of client devices of a client;
 ascertaining, by the server processor, user identifications (IDs) associated with the friend data;
 determining, by the server processor, device data indicative of friend devices as a function of the user IDs;
 determining, by the server processor, a set of capabilities to associate to the respective client device by:
  calculating, when the client is to change devices, to determine if caching model specific capabilities is feasible,
  calculating a mutual set of capabilities for the plurality of client devices,
  combining results of the calculations to form cacheable properties for the client and storing for later lookup,
 returning, by the server processor, the device data associated with the friend devices to the respective client device for use in communicating with the friends as a function of the calculation steps, wherein the server processor lists a number of friends based on an engagement level of the respective client device with the friend devices of the group of friends, wherein the device data includes a media format that the friend devices can decode, a preferred media size of the friend devices, as well as an average connection speed, screen size, operating system (OS) version, and information of encryption hardware; and
 automatically sending, by the server processor, a message to the friend devices that are currently caching client device data when the server processor detects that a capability of the respective client device changes.

2. The method of claim 1, wherein the number of friends listed is less than all of the group of friends based on a degree of interaction of the respective client device with the friend devices.

3. The method of claim 1, further comprising automatically and dynamically uploading and updating, by the server processor, the friend data on the respective client device when the friend logs into a different friend device.

4. The method of claim 1, further comprising using a mapping structure to determine the device data as a function of the user IDs.

5. The method of claim 4, further comprising using a data bank to store device capabilities in association with the device data.

6. A system comprising:
 a memory that stores instructions;
 a processor configured by the instructions to perform operations to:
  receive friend data of a group of friends from a respective client device running an application of a plurality of client devices of a client;
  ascertain user identifications (IDs) associated with the friend data;
  determine device data indicative of friend devices as a function of the user IDs;
  determine a set of capabilities to associate to the respective client device by:
   calculating, when the client is to change devices, to determine if caching model specific capabilities is feasible,
   calculating a mutual set of capabilities for the plurality of client devices,
   combining results of the calculations to form cacheable properties for the client and storing for later lookup,
  return the device data associated with the friend devices to the respective client device for use in communicating with the friends as a function of the calculation steps, wherein the processor is configured to list a number of friends based on an engagement level of the respective client device with the friend devices of the group of friends, wherein the device data includes a media format that the friend devices can decode, a preferred media size of the friend devices, as well as an average connection speed, screen size, operating system (OS) version, and information of encryption hardware; and automatically send a message to the friend devices that are currently caching client device data when the processor detects that a capability of the respective client device changes.

7. The system of claim 6, wherein the processor is configured to automatically and dynamically upload and update the friend data on the respective client device when the friend logs into a different friend device.

8. The system of claim 6, wherein the processor is configured to use a mapping structure to determine the device data as a function of the user IDs.

9. The system of claim 6, wherein the number of friends listed is less than all of the group of friends based on a degree of interaction of the respective client device with the friend devices.

10. A non-transitory processor-readable storage medium storing processor-executable instructions that, when executed by a processor of a machine, cause the machine to perform operations comprising:

receiving friend data of a group of friends from a respective client device running an application of a plurality of client devices of a client;

ascertaining user identifications (IDs) associated with the friend data;

determining device data indicative of friend devices as a function of the user IDs;

determining a set of capabilities to associate to the respective client device by:

calculating, when the client is to change devices, to determine if caching model specific capabilities is feasible, calculating a mutual set of capabilities for the plurality of client devices, combining results of the calculations to form cacheable properties for the client and storing for later lookup, returning the device data associated with the friend devices to the respective client device as a function of the calculation steps, and listing a number of friends based on an engagement level of the respective client device with the friend devices of the group of friends, wherein the device data includes a media format that the friend devices can decode, a preferred media size of the friend devices, as well as an average connection speed, screen size, operating system (OS) version, and information of encryption hardware; and automatically sending a message to the friend devices that are currently caching client device data when the processor detects that a capability of the respective client device changes.

11. The non-transitory processor-readable storage medium of claim 10, wherein the respective client device is configured to communicate with the friend devices as a function of the device data.

12. The non-transitory processor-readable storage medium of claim 10, further including instructions to automatically and dynamically upload and update the friend data on the respective client device when the friend logs into a different friend device.

13. The non-transitory processor-readable storage medium of claim 10, further including instructions to use a mapping structure to determine the device data as a function of the user IDs.

14. The non-transitory processor-readable storage medium of claim 10, wherein the number of friends listed is less than all of the group of friends based on a degree of interaction of the respective client device with the friend devices.

* * * * *